(12) United States Patent
West et al.

(10) Patent No.: US 9,381,912 B2
(45) Date of Patent: Jul. 5, 2016

(54) SYSTEM AND METHOD FOR DETECTING VEHICLE CLUTCH TOUCH POINT

(71) Applicant: Allison Transmission, Inc., Indianapolis, IN (US)

(72) Inventors: Stephen T. West, New Palestine, IN (US); Carl E. Perry, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/669,099

(22) Filed: Mar. 26, 2015

(65) Prior Publication Data

US 2015/0197245 A1 Jul. 16, 2015

Related U.S. Application Data

(63) Continuation of application No. PCT/US2014/020723, filed on Mar. 5, 2014.

(60) Provisional application No. 61/779,743, filed on Mar. 13, 2013.

(51) Int. Cl.
*B60W 20/00* (2016.01)
*B60W 10/02* (2006.01)
(Continued)

(52) U.S. Cl.
CPC .............. *B60W 20/40* (2013.01); *B60W 10/02* (2013.01); *B60W 10/06* (2013.01); *B60W 10/08* (2013.01);
(Continued)

(58) Field of Classification Search
CPC ................... B60W 20/40; B60W 2050/0011; F16D 2502/50245; F16D 2500/50275; F16D 2500/70626; B60K 6/48; F16H 2312/16; Y02T 10/6286
See application file for complete search history.

(56) References Cited

U.S. PATENT DOCUMENTS 5,439,428 A * 8/1995 Slicker .................... F16D 48/06
192/103 R
6,077,186 A * 6/2000 Kojima .................... B60K 6/48
180/65.25

(Continued)

FOREIGN PATENT DOCUMENTS

DE 102007052737 A1 * 6/2008 ............ B60W 10/02
JP 2006306207 A * 11/2006
(Continued)

OTHER PUBLICATIONS

International Search Report and Written Opinion issued in PCT/US2014/020723, dated Jun. 9, 2014, 13 pgs.

*Primary Examiner* — Behrang Badii
*Assistant Examiner* — David Testardi
(74) *Attorney, Agent, or Firm* — Woodard Emhardt Moriarty McNett and Henry LLP

(57) ABSTRACT

A hybrid system and method is configured to achieve and maintain a touch point for a clutch so as to allow an engine to rapidly restart. The hybrid system includes an eMachine configured to start the engine. The clutch is configured to operatively connect and disconnect the eMachine and the engine. A motor torque PID controller is configured to operate the eMachine at a desired speed by regulating torque of the eMachine. A clutch pressure PID controller is configured to actuate the clutch to a touch point by regulating clutch pressure. The motor torque PID controller and the clutch pressure PID controller include a compensation function to account for a change in torque caused by actuation of the clutch by the clutch pressure PID controller.

26 Claims, 8 Drawing Sheets

(51) Int. Cl.
*B60W 10/06* (2006.01)
*B60W 10/08* (2006.01)
*B60W 50/04* (2006.01)
*F02N 11/08* (2006.01)
*F16D 48/06* (2006.01)
*B60W 50/00* (2006.01)
*B60K 6/48* (2007.10)

(52) U.S. Cl.
CPC ......... *B60W 50/045* (2013.01); *F02N 11/0851* (2013.01); *F16D 48/06* (2013.01); *B60K 2006/4825* (2013.01); *B60W 2050/0011* (2013.01); *B60W 2050/0087* (2013.01); *B60W 2510/0216* (2013.01); *B60W 2510/0275* (2013.01); *B60W 2510/083* (2013.01); *B60W 2710/027* (2013.01); *B60W 2710/081* (2013.01); *B60W 2710/083* (2013.01); *F16D 2500/1066* (2013.01); *F16D 2500/50245* (2013.01); *F16D 2500/50281* (2013.01); *F16D 2500/50883* (2013.01); *F16D 2500/525* (2013.01); *F16D 2500/7027* (2013.01); *F16D 2500/7041* (2013.01); *F16D 2500/70626* (2013.01); *Y02T 10/6252* (2013.01); *Y02T 10/6286* (2013.01); *Y10S 903/93* (2013.01)

(56) References Cited

U.S. PATENT DOCUMENTS

| | | | | |
|---|---|---|---|---|
| 6,176,808 B1 * | 1/2001 | Brown | ........... | B60K 6/365 180/65.25 |
| 6,929,580 B2 | 8/2005 | Frotscher | | |
| 6,966,868 B2 * | 11/2005 | Stork | ........... | B60W 10/02 477/74 |
| 7,179,195 B2 * | 2/2007 | Joe | ........... | B60K 6/445 477/5 |
| 7,347,803 B2 * | 3/2008 | Kobayashi | ........... | B60K 6/48 192/48.8 |
| 7,370,715 B2 * | 5/2008 | Colvin | ........... | B60K 6/48 180/65.28 |
| 7,896,114 B2 * | 3/2011 | Colvin | ........... | B60K 6/48 180/65.28 |
| 8,142,328 B2 * | 3/2012 | Reuschel | ........... | B60K 6/387 180/65.275 |
| 8,187,146 B2 * | 5/2012 | Allgaier | ........... | B60K 6/48 180/65.28 |
| 2003/0001390 A1 * | 1/2003 | Phillips | ........... | B60K 6/48 290/40 C |
| 2004/0210373 A1 | 10/2004 | Graf et al. | | |
| 2006/0038406 A1 * | 2/2006 | Hino | ........... | B60R 16/03 290/40 C |
| 2008/0274856 A1 * | 11/2008 | Seel | ........... | B60K 6/48 477/6 |
| 2009/0017988 A1 * | 1/2009 | Reuschel | ........... | B60K 6/387 477/167 |
| 2009/0224713 A1 * | 9/2009 | Falkenstein | ........... | B60K 6/48 318/432 |
| 2010/0018790 A1 * | 1/2010 | Allgaier | ........... | B60K 6/48 180/65.265 |
| 2011/0118915 A1 * | 5/2011 | Ortmann | ........... | B60K 6/48 701/22 |
| 2011/0230307 A1 * | 9/2011 | Seel | ........... | B60K 6/365 477/5 |
| 2011/0320075 A1 * | 12/2011 | Kim | ........... | B60K 6/445 701/22 |
| 2012/0065820 A1 | 3/2012 | Morris | | |
| 2012/0083952 A1 * | 4/2012 | Smith | ........... | B60K 6/442 701/22 |
| 2012/0258838 A1 | 10/2012 | Hartz et al. | | |
| 2014/0032064 A1 * | 1/2014 | Thor | ........... | B60W 10/02 701/54 |
| 2014/0067174 A1 * | 3/2014 | Park | ........... | F16H 61/061 701/22 |
| 2015/0291144 A1 * | 10/2015 | Ortmann | ........... | B60W 10/02 477/5 |

FOREIGN PATENT DOCUMENTS

| | | |
|---|---|---|
| JP | 2010195363 A * | 9/2010 |
| KR | 10-2011-0011441 A | 2/2011 |
| WO | WO 2012/034031 A2 | 3/2012 |
| WO | WO 2012/104266 A1 | 8/2012 |

* cited by examiner

SYSTEM AND METHOD FOR DETECTING VEHICLE CLUTCH TOUCH POINT

CROSS REFERENCE TO RELATED APPLICATIONS

This application is a continuation of International Application No. PCT/US2014/020723 filed Mar. 5, 2014, which claims the benefit of U.S. Provisional Application No. 61/779,743 filed Mar. 13, 2013, which are hereby incorporated by reference.

BACKGROUND

With the growing concern over global climate change as well as oil supplies, there has been a recent urgency to develop commercially viable hybrid systems for motorized vehicles. One way hybrid systems conserve energy is by shutting down the internal combustion engine when the vehicle is stopped as well as in other situations, such as during regenerative braking, coasting, and/or power-take-off (PTO) unit operation. There is a need in these types of situations to be able to rapidly restart the engine in order to provide adequate power, though. Taking for example when the vehicle is stopped at a stoplight, the internal combustion engine is shut down and not burning any fuel. When the driver removes his or her foot from the brake pedal, the internal combustion engine needs to rapidly restart before the driver places their foot on the gas pedal. If not, the driver will experience a sense of lag and/or inadequate power when moving the vehicle from a complete stop.

Thus, there is a need for improvement in this field.

SUMMARY

The hybrid system and technique described herein address several of the issues mentioned above as well as others.

As will be explained in greater detail below, one source for the delay in restarting an engine from shut down is clutch lag. In certain hybrid vehicle designs, the electric motor/generator, commonly referred to as an eMachine, is not only used to generate power and move the vehicle but is also used to restart the engine. In one such design, a clutch is operatively disposed between the eMachine and the internal combustion engine so as to selectively engage and disengage the two. When the engine is stopped, such as at a stoplight, the clutch is open so that the eMachine is able to power ancillary devices such as hydraulic pumps and the like while the engine is shut down. To restart the engine, the clutch is closed so that the eMachine is able to crank the engine.

Since hydraulics are typically used to move the clutch plates, there is a significant time delay or lag involved in engaging the clutch plates. In order to improve response time, it is often advantageous to actuate the clutch to the point where the plates are just making contact—where a small amount of torque is being applied across the clutch. This point is generally referred to as the touch point. The clutch plates have to be just contacting and held at this touch point so that the engine can be quickly restarted. From the time the driver releases the brake pedal, the hybrid system has to close the clutch and restart the engine within about one-half of a second (0.5 sec.). One difficulty experienced is identifying this touch point between the clutch plates as well as maintaining or holding the clutch plates at the touch point. Over time, the clutch plates as well as other components can wear which in turn can change the touch point. Moreover, changes in thermal conditions as well as other variables can vary the touch point. Since a fast response is needed to restart the engine, the clutch connecting the engine to the rotating transmission input needs to be held at the touch point. The technique described below allows the touch point to be readily detected and maintained without the need for additional sensors and/or inputs.

As will be discussed below, a method and system have been developed for detecting, holding, and quantifying the touch point in a transmission featuring an electric motor. The unique control system and method allow the clutch to be held at the touch point for an extended period time without damaging the clutch. In one example, a unique proportional-integral-derivative (PID) controller with a droop feedback is used for quantifying or detecting the touch point. The droop feedback allows the controlled speed to drop linearly as the torque required increases which in turn is used to identify and quantify the touch point. Another PID controller is used to actuate the clutch until a fixed droop in motor speed is obtained.

Further forms, objects, features, aspects, benefits, advantages, and embodiments of the present invention will become apparent from a detailed description and drawings provided herewith.

DETAILED DESCRIPTION

Figure 1:
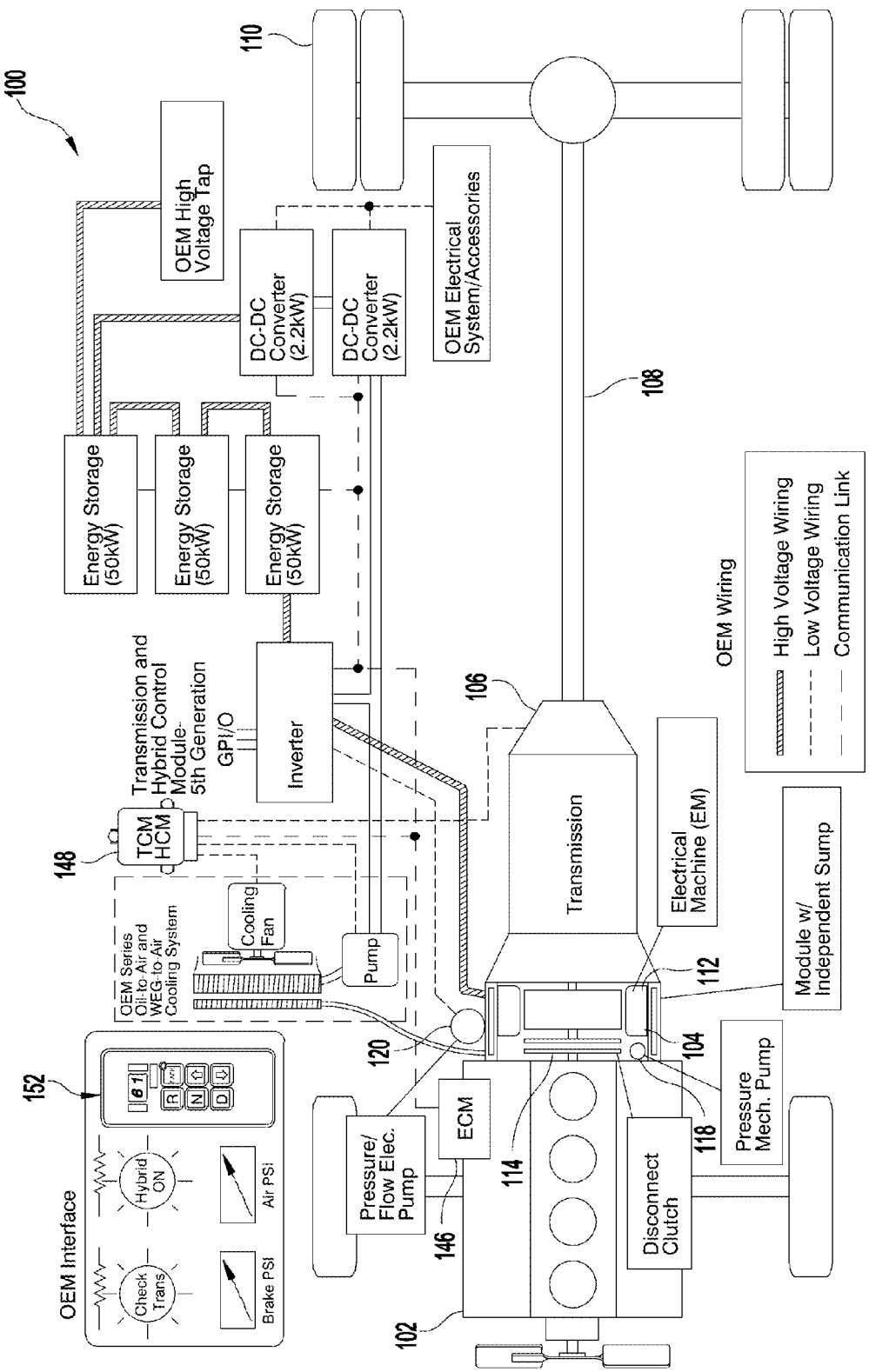
FIG. 1 is a diagrammatic view of one example of a hybrid system.

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will generally first appear in FIG. 1, an element identified by a "200" series reference numeral will first appear in FIG. 2, and so on. With reference to the Specification, Abstract, and Claims sections herein, it should be noted that the singular forms "a", "an", "the", and the like include plural referents unless expressly discussed otherwise. As an illustration, references to "a device" or "the device" include one or more of such devices and equivalents thereof.

Figure 2:
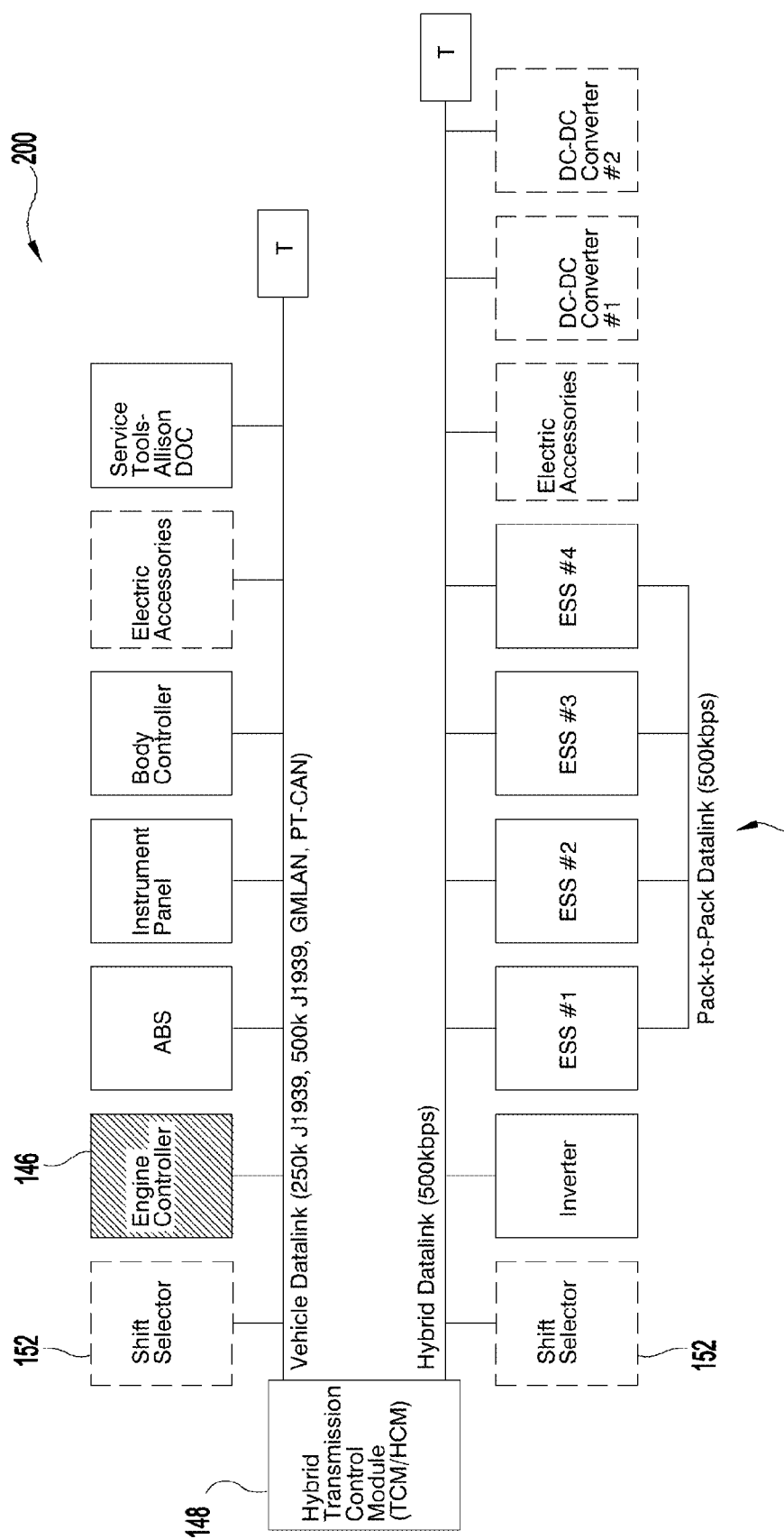
FIG. 2 is a general diagram of an electrical communication system in the FIG. 1 hybrid system.
Figure 3:
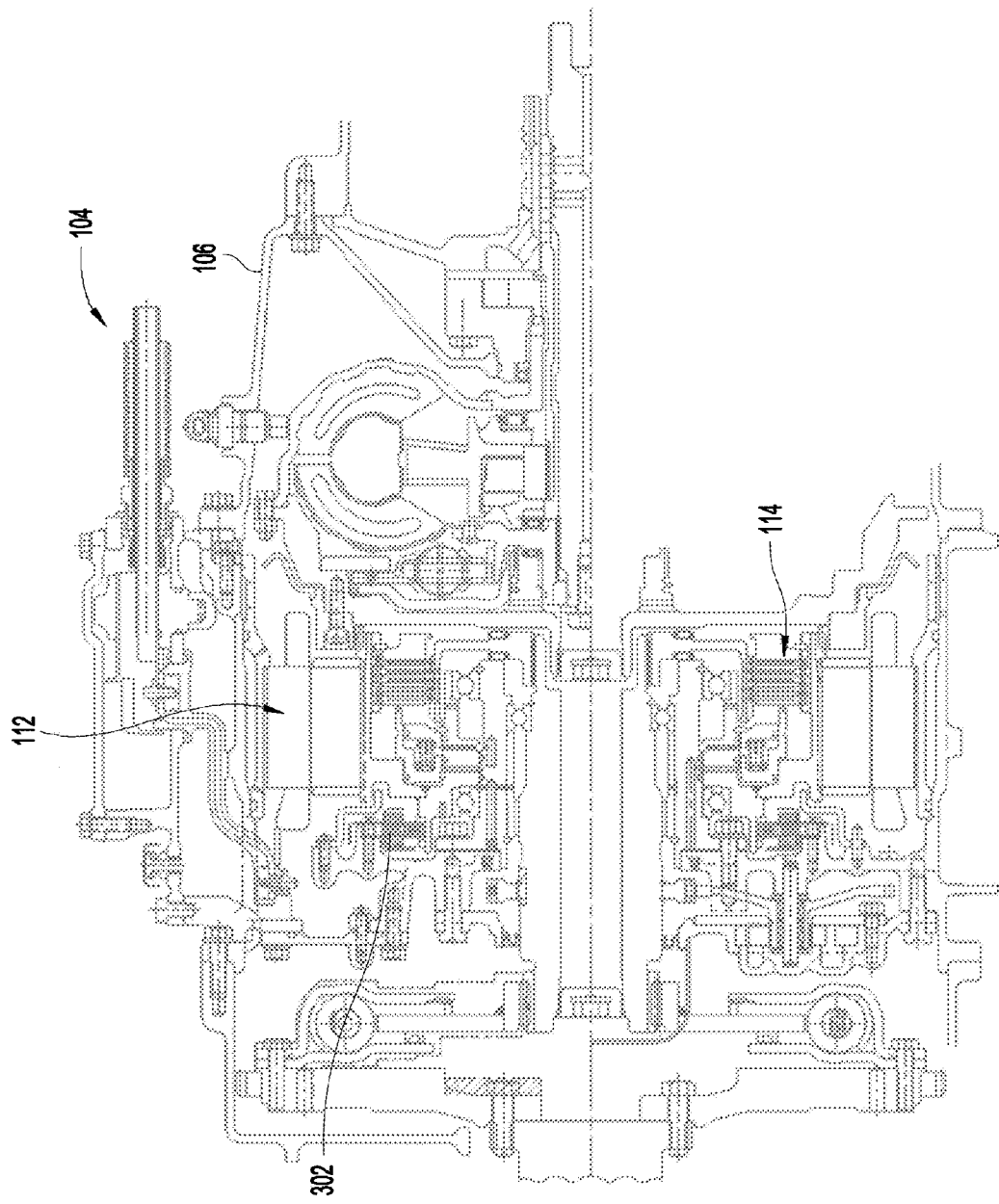
FIG. 3 is a cross-sectional view of a hybrid module used in the hybrid system.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electrical machine, commonly referred to as an eMachine 112, and a clutch 114 that operatively connects and disconnects the engine 102 from the eMachine 112 and the transmission 106. The hybrid system 100 incorporates a number of control systems for controlling the operations of the various components. For example, the engine 102 has an engine control module 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. In a typical embodiment, the transmission/hybrid control module 148 and engine control module 146 each comprise a computer having a processor, memory, and input/output connections. Additionally, other vehicle subsystems may also contain computers having similar processors, memory, and input/output connections. The system 100 includes a shift selector 152 for selecting whether the vehicle is in drive, neutral, reverse, etc. FIG. 2 shows a diagram of one example of a communication system 200 that can be used in the hybrid system 100. While one example is shown, it should be recognized that the communication system 200 in other embodiments can be configured differently than is shown. FIG. 3 shows a cross-sectional view of an example of the hybrid module 104 used in the hybrid system 100. As can be seen, the hybrid module includes, among other things, the eMachine 112 and clutch 114 along with a resolver 302 that measures the rotational speed of the of the eMachine 112. The various components of the hybrid system 100 as well as their function are discussed in further detail in U.S. patent application Ser. No. 13/527,953, filed Jun. 20, 2012, published as US 2012/0258838 A1, and International Application No. PCT/US2011/051018, filed Sep. 9, 2011, published as WO 2012/034031 A2, which are hereby incorporated by reference.

Figure 4:
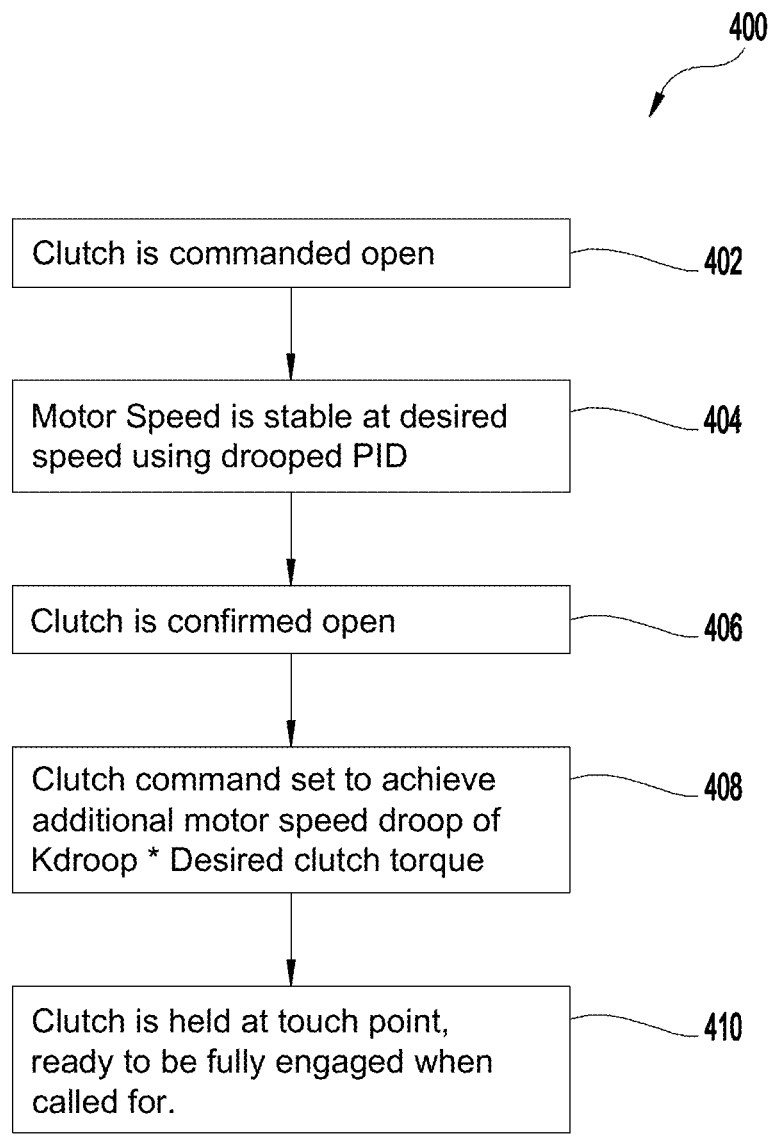
FIG. 4 is a flow diagram depicting a method of clutch touch point detection and maintenance.

A technique for detecting, holding, and quantifying the touch point in for the clutch 114 will be initially described with reference to flowchart 400 in FIG. 4. This method was developed as part of a hybrid feature to shut down the engine 102 when the transmission 106 is in a drive state, such as at stoplights, as well as in other circumstances, even when the vehicle is not in drive. This technique can be used under many circumstances where there is a need to rapidly close the clutch 114 and/or rapidly start the engine. For example, this technique can also be used during or after regenerative braking and/or electrical power-take-off (ePTO) operations, to name just a few. Since a fast response is needed to restart the engine 102, the clutch 114 connecting the engine 102 to the transmission 106 is held at the touch point. Among other things, this technique allows the clutch 114 to be held at the touch point for an extended period of time without damaging the clutch 114. The acts or stages in the flowchart 400 will be described as being performed by the TCM/HCM 148 in conjunction with other components of the system 100, but it should be recognized that other types of systems can be used to perform these acts. In one example, this method is performed via one or more software programs or processes in the TCM/HCM 148.

With this technique, two proportional-integral-derivative (PID) controllers have been modified to facilitate touch point detection for the clutch 114. One of the PID controllers is a motor torque PID controller, which will be later discussed in detail with reference to FIG. 7, and the other is a clutch pressure PID controller that will be later discussed with reference to FIG. 8. It should be recognized that these PID controllers are just two of many PID controllers used to operate the hybrid system 100. In this example, the PID controllers will come in the form of software that is executed by the TCM/HCM 148, but it should be appreciated that these PID controllers can be executed in other forms such as via firmware and/or hardware. Moreover, other components within the hybrid system 100 can incorporate all or part of these PID controllers. The motor torque PID controller and the clutch pressure PID controller have been modified to include a compensation function ($K_{droop}$) that allows them to operate in a cooperative manner. The motor torque PID controller controls the speed of the eMachine 112 to a desired speed by adjusting the torque provided by the eMachine 112. The clutch pressure or touch point PID controller adjusts the applied hydraulic pressure to the clutch 114 to achieve a desired clutch torque based on motor speed of the eMachine 112. Without the compensation function ($K_{droop}$), the two PID controllers would in essence fight with one another. The motor torque PID controller would attempt to maintain the desired speed of the eMachine 112 by increasing the torque applied by the eMachine 112 while the touch point or clutch pressure PID controller applies ever greater torque through greater hydraulic pressure to the clutch 114. The compensation function ($K_{droop}$) addresses this issue by allowing the desired speed to decrease in a linear fashion as greater torque is applied.

This approach offers a number of advantages. First, the clutch 114 can be held at a defined touch point for an extended period of time. Second, the power dissipated in the clutch 114 during this operation is well defined. It is simply the product of the desired clutch torque and the slip speed of the clutch. The slip speed is the speed difference between the two shafts coupled by the clutch. Knowing the power is a significant advantage, it allows the clutch 114 to carry out this function without damage. Third, this technique allows the maintenance of an accurate touch point even when the clutch plates in the clutch 114 wear over time. To better appreciate how this compensation function ($K_{droop}$) interacts with the PID controllers, some background information about PID controllers has been provided below.

A PID controller is a control loop feedback type mechanism that attempts to minimize error by adjusting process control inputs. PID controllers generally use three control tuning parameters: the proportional, integral, and derivative tuning parameters. PID controllers are a common architecture for implementing closed loop speed control. Equation 1 below provides a generic form for the PID control scheme.

$$u(t) = K_p e(t) + K_i \int_0^t e(\tau) d(\tau) + K_d \frac{d}{dt} e(t) \qquad \text{Equation 1}$$

where:
u=controller output
$K_p$=proportional gain (tuning parameter)
$K_i$=integral gain (tuning parameter)
$K_d$=derivative gain (tuning parameter)
e=error
t=time
τ=integration variable As should be appreciated, the tuning or control parameters in Equation 1 (i.e. $K_p$, $K_i$, and $K_d$) are designated based on the desired control response. The error term or value in Equation 1 is calculated via Equation 2 below.

$$e = X_{ref} - X \qquad \text{Equation 2}$$

where:
$X_{ref}$=set point
X=measured value

The set point ($X_{ref}$) is the desired value or property one wishes to achieve, and the measured value (X) is the current reading for that particular value. As can be seen, the error value (e) is the difference between the set point ($X_{ref}$) and the measured value (X). As an example, the set point ($X_{ref}$) would be the desired speed set by the driver (e.g., 55 mph) for a cruise control system, and the measured value (X) would be the current speed of the vehicle. The error (e) value would be the difference between the set cruise control speed and the current speed. The PID controller is designed to reduce this error (e) value to zero such that the vehicle would reach the desired cruising speed. For instance, when the cruise control is on, the PID controller replaces the driver and directly tells the engine how much torque is required. In this example, the PID controller output (u(t)) is the torque command from the PID controller to the engine.

Figure 5:
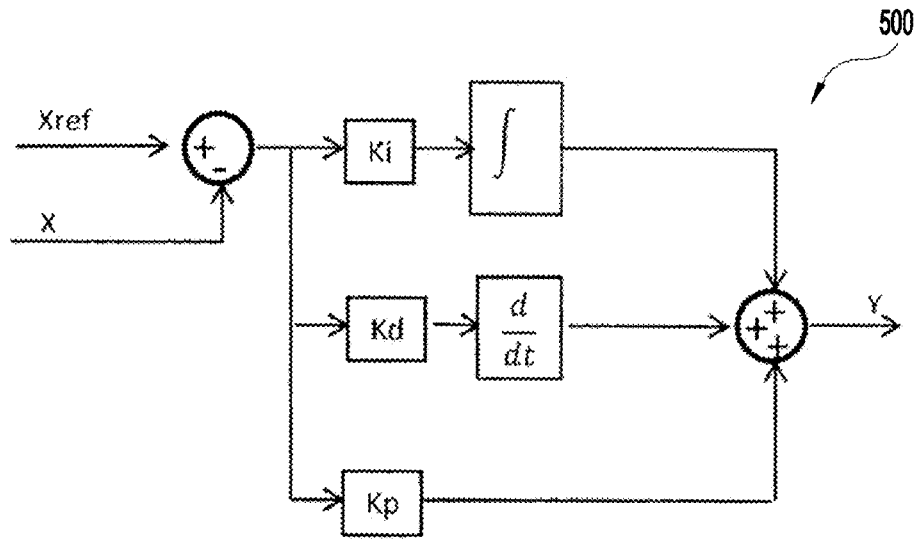
FIG. 5 is a block diagram of a continuous PID control.

FIG. 5 shows a diagram 500 of a continuous time form PID controller, and Equation 3 below is the equation represented by the diagram 500 in FIG. 5. It should be appreciated that Equation 3 is simply a different representation of the same equation as in Equation 1.

$$y = K_p (X_{ref} - X) + K_i \int (X_{ref} - X) + K_d \frac{d}{dt}(X_{ref} - X) \qquad \text{Equation 3}$$

where:
y=controller output

Figure 6:
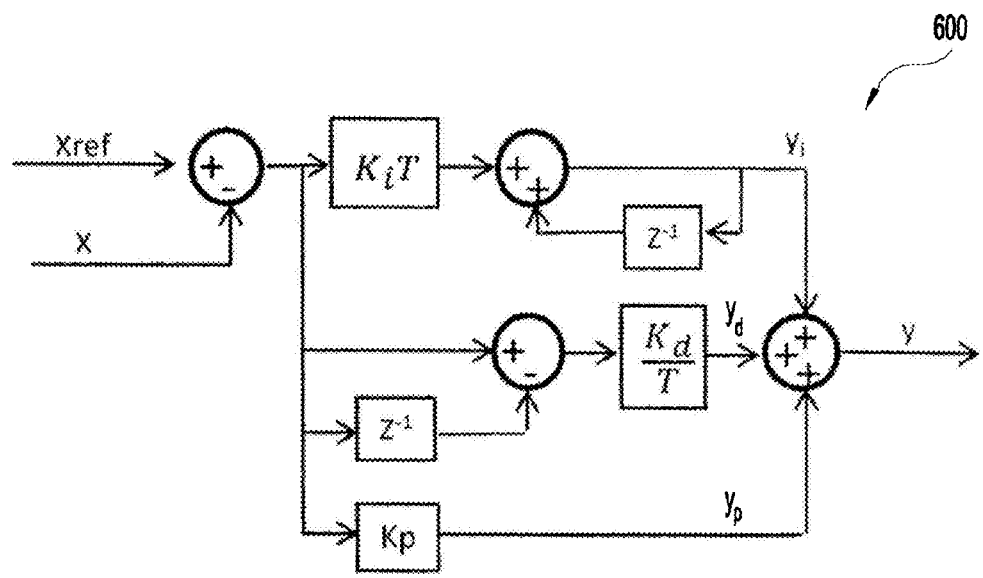
FIG. 6 is a block diagram of a discrete PID control.

Given that most computers are digital nowadays, a discrete form of the PID control scheme is typically used. FIG. 6 shows a diagram 600 that represents this discrete form of PID control. Equation 4 below is the mathematical representation of the PID control scheme shown by the diagram 600 in FIG. 6.

$$y(n) = y_i(n) + y_d(n) + y_p(n) \qquad \text{Equation 4}$$

where:
$y_i$=integral output value
$y_d$=derivative output value
$y_p$=proportional output value
n=discrete period Equation 5 below shows how the proportional value of Equation 4 is determined using a discrete PID control system. The proportional term produces an output value that is proportional to the current error value. As can be seen, the error value is multiplied by the proportional gain ($K_p$). A high proportional gain value ($K_p$) generally causes a large change in output for a given error, and a small proportional gain value ($K_p$) results in a small change in output.

$$y_p = K_p (X_{ref}(n) - X(n)) \qquad \text{Equation 5}$$

Equation 6 shows how the integral output value of Equation 4 is determined for a discrete PID control system. The integral term gives an accumulated offset that incorporates the sum of instantaneous errors over time so as to eliminate residual steady-state errors. This accumulated error is multiplied by the integral gain ($K_i$) and then added to the controller output (y) in Equation 3. Since this method is discrete, the integral output value ($y_i$) from the previous discrete time period is added to the one from the current time period.

$$y_i(n) = y_i(n-1) + K_i T (X_{ref}(n) - X(n)) \qquad \text{Equation 6}$$

where:
T=sample period

Equation 7 shows how the derivative output value of Equation 4 is determined for a discrete PID control system. The derivative term is used to determine the slope of the error over time. Generally, the derivative term is used to predict system behavior. The size of the derivative gain value ($K_d$) determines how much the derivative value term contributes to the overall controller output.

$$y_d(n) = \frac{K_d}{T}(X_{ref}(n) - X_{ref}(n-1) - x(n) + x(n-1)) \qquad \text{Equation 7}$$

As mentioned before, the method illustrated in FIG. 4 utilizes two PID controllers: the motor torque PID controller and the clutch pressure (or touch point) PID controller. For the purposes of discussion, these two controllers will be described as operating simultaneously or near simultaneously as separate processes within the HCM/TCM 148. In other examples, all or part of these PID controllers can operate in a sequential fashion or other manners.

Referring again to FIGS. 1, 3, and 4, the TCM/HCM 148 in stage 402 issues a command to open the clutch 114. This for example can occur when the vehicle is stopped at a stoplight. When stopped at a stoplight or in other situations, it is desirable to shut down the engine 102 in order to conserve fuel. Disconnecting the clutch 114 in stage 402 allows the eMachine 112 to still operate so as to provide power to ancillary equipment such as hydraulic systems in the transmission 106 as well as elsewhere. In certain situations, the clutch 114 can be disconnected before the vehicle comes to a complete stop such as during regenerative braking. In one illustrative example, the clutch 114 is in an open state so as to disconnect the transmission 106 from the engine 102 while the shift selector 152 is still in the drive state, and the TCM/HCM 148 senses no motion of the vehicle.

Figure 7:
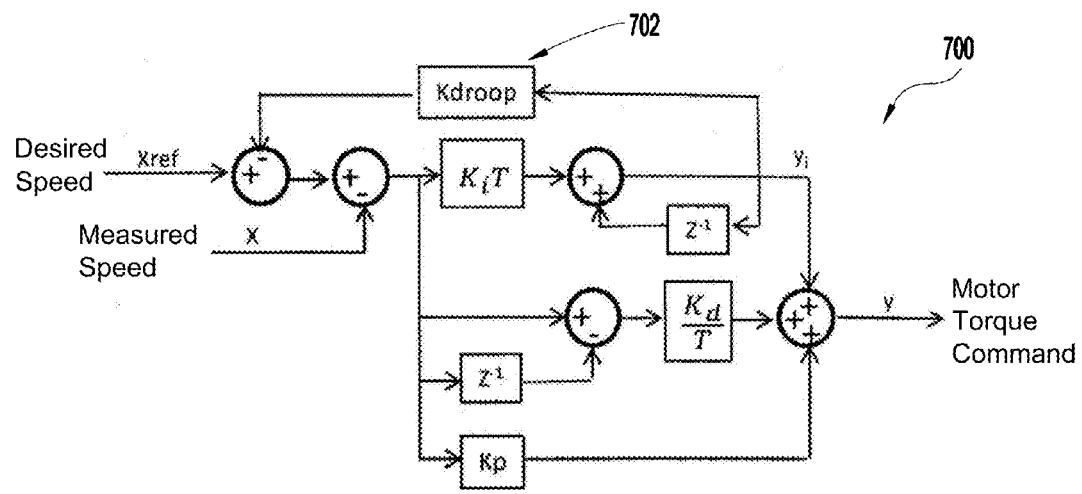
FIG. 7 is a block diagram of a PID controller with droop feedback for eMachine torque control.
Figure 8:
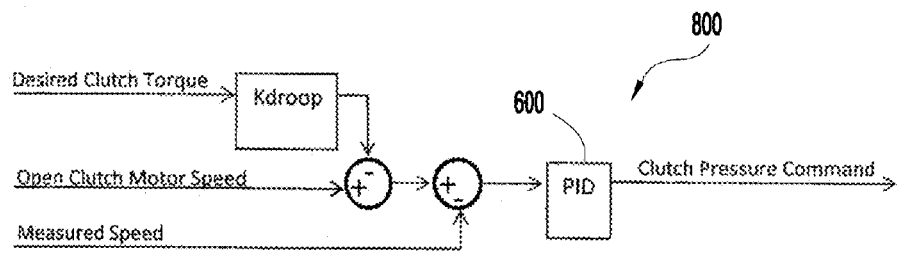
FIG. 8 is a block diagram of a PID controller for clutch pressure control.

In stage 404, the speed of the eMachine 112 is stabilized to a desired speed using the motor torque PID controller of the type illustrated by diagram 700 in FIG. 7. The eMachine 112 in this stage is used to hold one side of the clutch 114 at a desired rotational speed. The motor torque PID controller 700 includes the PID control functions of the type described above with reference to FIG. 6, but it further includes a feedback compensation function 702 (e.g., $K_{droop} y_i$) that allows the motor torque PID controller 700 to operate in a cooperative fashion with the touch point PID controller. The motor torque PID controller 700 provides a motor torque output command (y) based on the desired speed ($X_{ref}$) for the eMachine 112 (e.g., 525 rpm) and the actual measured speed (X) of the eMachine 112 from the resolver 302. Generally, the greater difference between the desired speed ($X_{ref}$) and the actual speed (X) causes a larger motor torque output command value (y). For instance, when the speed of the eMachine 112 is well below the desired speed ($X_{ref}$), the TCM/HCM 148 will instruct the eMachine 112 to increase its torque by a significant amount.

As noted above, the motor torque PID controller 700 includes a feedback compensation function 702 that adjusts the error value supplied to the PID controller. This adjustment of the error value is represented by Equation 8 below. In Equation 8, the feedback compensation function 702 is the value of the integral output value ($y_i$) multiplied by a droop tuning parameter ($K_{droop}$). In other words, the desired speed ($X_{ref}$) is reduced by this feedback compensation function 702. To avoid noise issues associated with the derivative ($y_d$) and proportional ($y_p$) output values, the feedback compensation function 702 is only based on the integral output value ($y_i$) as adjusted by the droop tuning parameter ($K_{droop}$). Otherwise, the motor torque PID controller 700 would experience significant stability issues. In one example, the droop tuning parameter ($K_{droop}$) is 1 rpm/Nm, but it should be recognized that the droop tuning parameter ($K_{droop}$) can be different in other circumstances.

$$e(n) = X_{ref} - K_{droop} y_i - X \qquad \text{Equation 8}$$

where:
$K_{droop}$=droop tuning parameter

In stage 404, the motor torque of the eMachine 112 is adjusted until a steady state or stable condition is achieved for the motor torque PID controller 700. Equation 9 below is the equation resulting from Equation 8 achieving this steady state condition.

$$0 = X_{ref} - K_{droop} y_i - X \qquad \text{Equation 9}$$

In a steady state, the proportional ($y_p$) and derivative ($y_d$) output values become zero (0). As a result, the motor torque command of value (y) becomes the integral output value ($y_i$). Equation 10 shows this relationship between the motor torque command value (y) and the integral output value ($y_i$) at a steady-state.

$$y_i = y(n) \qquad \text{Equation 10}$$

Combining Equations 9 and 10 while solving for the measured speed (X) yields Equation 11.

$$X = X_{ref} - K_{droop} y(n) \qquad \text{Equation 11}$$

Thus, in a steady state, the motor speed (X) of the eMachine 112 is driven to where desired speed ($X_{ref}$) is reduced by the compensation function 702. It should be appreciated that Equation 11 forms a linear equation. While this compensation function relationship is linear in Equation 11, it is envisioned that in other circumstances this relationship can be non-linear. With this relationship, the name of feedback compensation function 702 (e.g., $K_{droop} y_i$) should become apparent. The controlled speed for the eMachine 112 is allowed to drop (or droop) linearly as the torque required increases. This feature is helpful so as to compensate for the increased torque as the clutch pressure command PID controller applies greater torque as a result of applying greater clutch pressure to the clutch 114. In other words, this compensation function 702 prevents the motor torque and clutch pressure PID controllers from fighting one another. The control speed for the eMachine 112 is allowed to droop in a linear fashion as the clutch pressure PID controller applies greater torque via the clutch 114.

In stage 406, the TCM/HCM 148 confirms that the clutch 114 is in an open state by comparing the speed of the eMachine 112 to the speed of the engine 102. As noted before, the TCM/HCM 148 receives the speed of the eMachine 112 from the resolver 302. In a similar fashion, the TCM/HCM 148 receives the speed of the engine from the ECM 146. If the speed of the eMachine 112 is different from the speed of the engine 102, the clutch 114 is then confirmed to be in an open state. In selected examples, this difference in speed can include a threshold level so as to eliminate any false positive such as when clutch slipping might incidentally occur and/or from measurement errors. For instance, the TCM/HCM 148 in one embodiment considers the clutch 114 to be open when there is a 25 RPM difference between the engine speed and the speed of the eMachine 112. Of course, different threshold levels or no thresholds could be used in other embodiments. In stage 406, the TCM/HCM 148 records in memory the speed of the eMachine 112 when the open clutch condition is detected. As will be explained below with reference to stage 408, this open clutch speed is a variable that is used by the clutch pressure PID controller.

Once the clutch 114 is confirmed to be open in stage 406, the clutch 114 is actuated to achieve a fixed, additional (presumably small) speed droop in order to bring the clutch to the touch point. The TCM/HCM 148 via the clutch pressure PID controller regulates the clutch pressure so as to achieve the desired clutch torque that would signify the touch point between the clutch plates within the clutch 114. One example of the clutch pressure PID controller is illustrated by diagram 800 in FIG. 8. As can be seen, the clutch pressure PID controller incorporates the discrete PID controller 600 of the type illustrated in FIG. 6, but it should be appreciated that the clutch pressure PID controller can incorporate other types of PID controllers, such as the continuous PID controller 500 depicted in FIG. 5. Like the motor torque PID controller 700, the error supplied to the PID 600 in the clutch pressure PID controller 800 is modified by the same droop tuning parameter ($K_{droop}$) used in the motor torque PID controller 700. This error signal (e(n)) supplied to the PID 600 is represented by Equation 12 below.

$$e(n) = X_{open} - C_{ref} K_{droop} - X \qquad \text{Equation 12}$$

where:
$X_{open}$=open clutch eMachine speed
$C_{ref}$=desired clutch torque
X=measured eMachine speed As can be seen, the droop tuning parameter ($K_{droop}$) is multiplied by the desired clutch torque ($C_{ref}$) which is then subtracted from the motor speed ($X_{open}$) of the eMachine 112 when the open clutch condition of stage 406 occurs. As noted before, the TCM/HCM 148 records in memory the speed of the eMachine 112 when the open clutch condition occurs. The TCM/HCM 148 retrieves the open clutch motor speed ($X_{open}$) for the clutch pressure PID controller 800 recorded in stage 406. The desired clutch torque ($C_{ref}$) is a pre-designated value that signifies the clutch torque when the desired clamping force is applied between the clutch plates. In one example, the desired clutch torque ($C_{ref}$) is 25 Nm so that the TCM/HCM 148 is confident that the touch point has occurred. Any number of factors can affect the sensitivity of the measurements made in the hybrid system 100. To avoid the resulting errors created by this lack of sensitivity, the desired clutch torque ($C_{ref}$) is picked high enough so as to be unaffected by any variations within the hybrid system 100. It nevertheless should be appreciated that the desired clutch torque ($C_{ref}$) can be lower or higher in other types of hybrid systems. For instance, where the hybrid system 100 is designed to have a high degree of sensitivity in its torque, motor speed, and other measurements, the desired clutch torque ($C_{ref}$) can be much lower, such as 1 Nm.

The clutch pressure PID controller 800 continues to adjust the hydraulic pressure to the clutch 114 until the desired clutch torque is achieved which in turn would indicate that the clutch 114 is at the touch point. In stage 410, the clutch 114 is held at the touch point via the clutch pressure PID controller 800. The clutch pressure PID controller 800 maintains the clutch 114 at the touch point until the engine needs to be restarted. At that point, the clutch pressure is increased so as to ensure full engagement of the clutch 114 so as to allow the eMachine 112 to act as a starter motor and restart the engine 102. For instance, the clutch 114 can be fully reengaged as soon as the driver releases their foot from the brake pedal at a stoplight.

Figure 9:
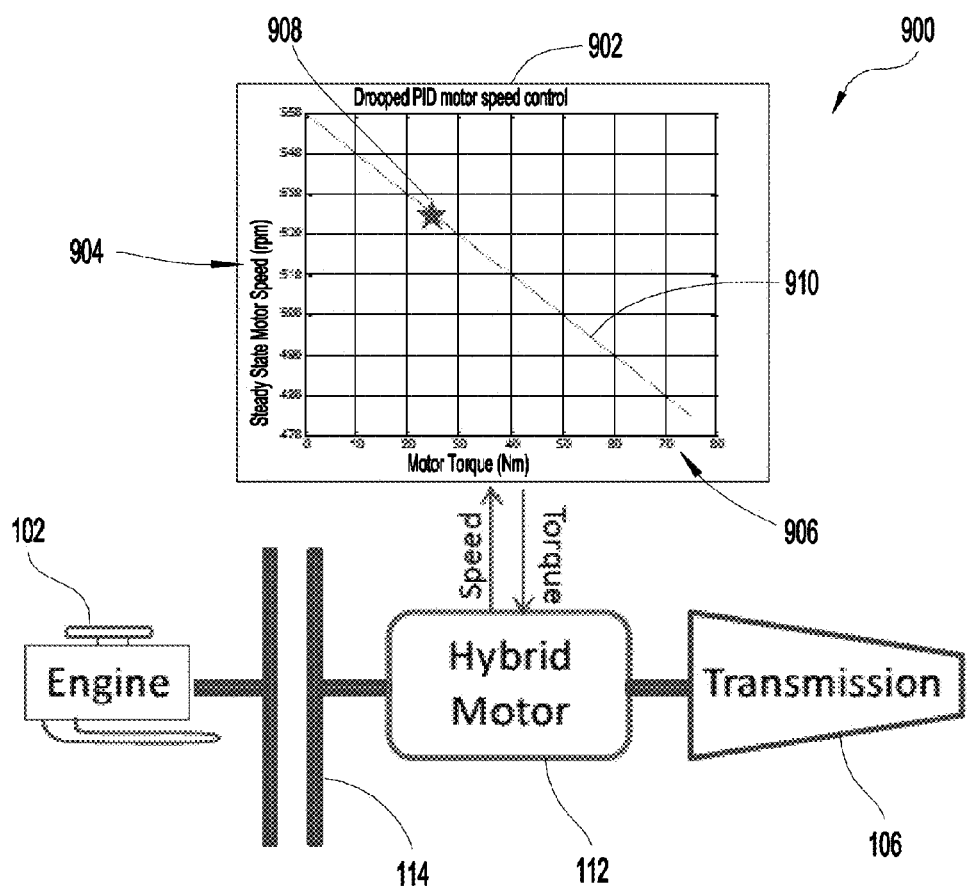
FIG. 9 is a diagram depicting the relation between electric motor speed and torque under an open clutch condition.

A specific example of how this control technique functions will be described with reference to FIGS. 9 and 10. Again, these are just examples and there is no intent to limit the scope of protection to just these particular examples. Diagram 900 in FIG. 9 depicts the state of the hybrid system 100 when the clutch 114 is open in stages 402, 404, and 406. In particular, the diagram 900 in FIG. 9 illustrates the state of the engine 102, clutch 114, eMachine 112, and transmission 106 when the clutch 114 is open. The diagram 900 further includes a graph 902 comparing the steady-state speed of the eMachine 112 at axis 904 to the motor torque from the eMachine 112 at axis 906 when the motor torque PID controller 700 is functioning. In this particular example, the desired speed ($X_{ref}$) for the motor torque PID controller 700 is 525 rpm and is shown by data point 908 on the graph 902. The motor torque PID controller 700 in this example stabilizes the speed of the eMachine 112 to 525 rpm. As mentioned before, the motor torque is able to vary linearly with the control effort of the motor torque PID controller 700 via the feedback compensation function 702 (e.g., $K_{droop}y_i$). This allows the stabilized speed of the eMachine 112 to drop as the clutch pressure PID controller 800 applies additional torque via the clutch 114. Line 910 on the graph represents this ability to change the motor torque in a linear fashion. The slope of the line 910 is the droop tuning parameter ($K_{droop}$).

Figure 10:
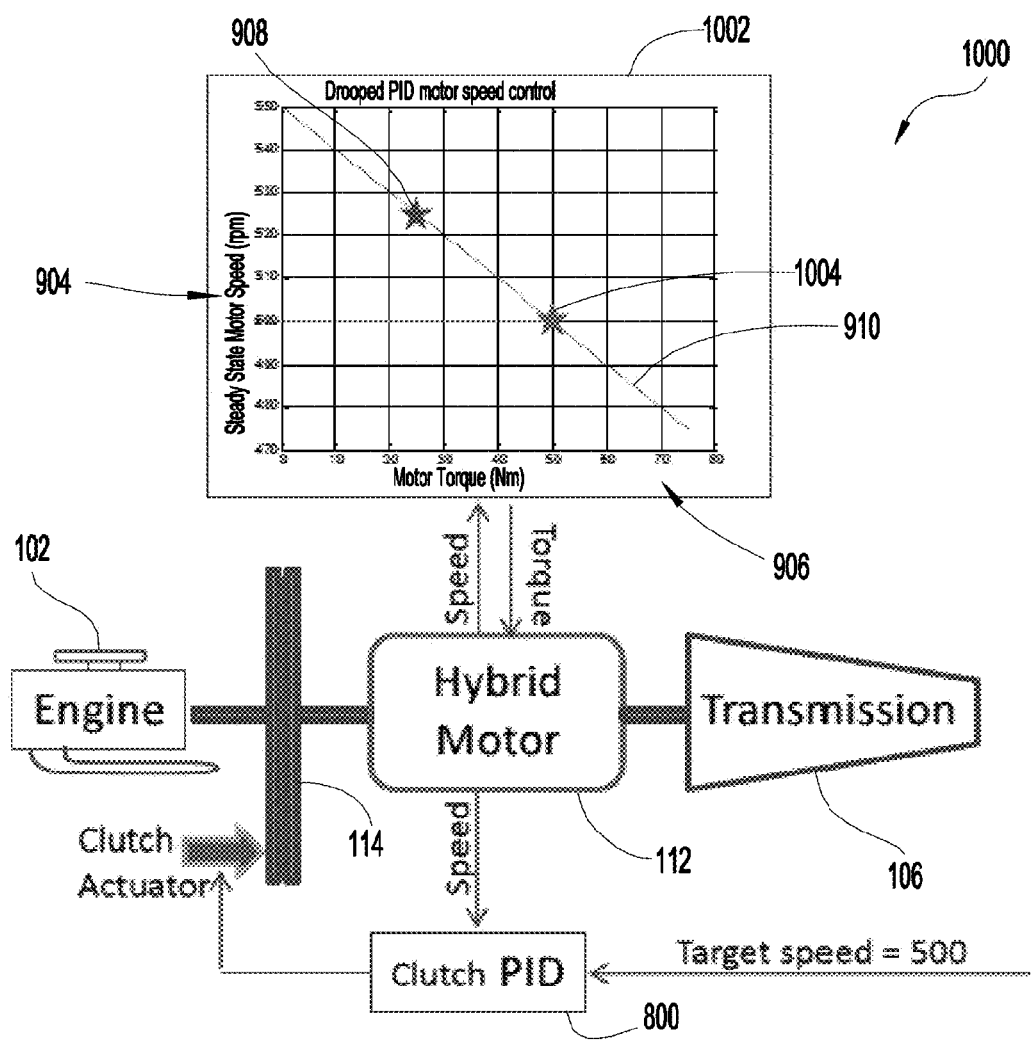
FIG. 10 is a diagram depicting the relation between electric motor speed and torque when the clutch is at the touch point.

FIG. 10 includes a diagram 1000 that depicts the state of the engine 102, clutch 114, eMachine 112, and transmission 106 when the touch point is achieved and maintained during stages 408 and 410. The diagram 1000 in FIG. 10 includes a graph 1002 that is similar to the one described before. As can be seen, the graph 1002 includes the motor speed axis 904 and the motor torque axis 906. To bring the clutch 114 to the touch point, the clutch pressure PID controller 800 actuates the clutch 114 which in turn increases the motor torque and reduces the speed of the eMachine 112. Again, the motor torque is able to vary linearly with the control effort of the motor torque PID controller 700 via the feedback compensation function 702 (e.g., $K_{droop}y_i$). The line 910 in FIG. 1002 represents this ability to linearly adjust the motor speed. Once the touch point is achieved, as indicated by data point 1004 in FIG. 10, the clutch pressure PID controller 800 maintains the clutch pressure at this particular touch point. In the illustrated example, the touch point as shown by data point 1004 is achieved at a speed of 500 rpm for the eMachine 112.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A method, comprising:
controlling speed of an eMachine in a hybrid system to a desired speed with a motor torque PID controller that regulates torque of the eMachine, wherein the eMachine is operatively connected to an engine via a clutch;
actuating the clutch to a touch point by regulating clutch pressure with a clutch pressure PID controller;
adjusting the desired speed for the motor torque PID controller by a compensation function, wherein the compensation function changes the desired speed to account for a change in torque caused by said actuating the clutch; and
maintaining the clutch at the touch point with the clutch pressure PID controller before starting the engine.

2. The method of claim 1, further comprising:
issuing a command to open the clutch;
stabilizing the speed of the eMachine by said controlling the speed of the eMachine after said issuing;
confirming the clutch is open; and
achieving a motor speed droop by said adjusting.

3. The method of claim 1, further comprising:
closing the clutch after said actuating the clutch; and
restarting an engine with the eMachine after said closing the clutch.

4. The method of claim 1, wherein the motor torque PID controller and/or the clutch pressure PID controller include a PID controller that operates in accordance with the following equation:

$$u(t) = K_p e(t) + K_i \int_0^t e(\tau)d(\tau) + K_d \frac{d}{dt}e(t)$$

where:
u=controller output;
$K_p$=proportional gain (tuning parameter);
$K_i$=integral gain (tuning parameter);
$K_d$=derivative gain (tuning parameter);
e=error;
t=time; and
τ=integration variable.

5. The method of claim 1, wherein the motor torque PID controller incorporates an error function in accordance with the following equation:

$$e(n) = X_{ref} - K_{droop}y_i - X$$

where:
e=error;
$X_{ref}$=eMachine desired speed;
X=eMachine measured speed;
$K_{droop}$=droop tuning parameter; and
$y_i$=integral output value.

6. The method of claim 1, wherein the compensation function is a linear function of the speed and the torque of the eMachine.

7. The method of claim 1, wherein said adjusting the desired speed by the compensation function adjusts in accordance with the following equation:

$$X = X_{ref} - K_{droop} y(n)$$

where:
X=eMachine measured speed;
$X_{ref}$=eMachine desired speed;
$K_{droop}$=droop tuning parameter; and
y(n)=eMachine motor torque.

8. The method of claim 1, wherein the clutch pressure PID controller incorporates an error function in accordance with the following equation:

$$e(n) = X_{open} - C_{ref} K_{droop} - X$$

where:
e=error;
$X_{open}$=open clutch eMachine speed;
$C_{ref}$=desired clutch torque;
$K_{droop}$=droop tuning parameter; and
X=measured eMachine speed.

9. The method of claim 8, wherein the desired clutch torque is 25 Nm.

10. The method of claim 1, wherein the motor torque PID controller and/or the clutch pressure PID controller is a discrete PID controller.

11. The method of claim 1, wherein the clutch includes a hydraulic clutch.

12. The method of claim 1, wherein the touch point is where clutch plates in the clutch first contact one another.

13. A hybrid system, comprising:
an eMachine configured to start an engine;
a clutch configured to operatively connect and disconnect the eMachine and the engine;
a motor torque PID controller configured to operate the eMachine at a desired speed by regulating torque of the eMachine;
a clutch pressure PID controller configured to hold the clutch to a touch point while transmitting clutch torque by regulating clutch pressure before the engine needs to be restarted; and
wherein the motor torque PID controller and the clutch pressure PID controller include a compensation function, wherein the compensation function changes the desired speed to account for the transmitted clutch torque caused by actuation of the clutch by the clutch pressure PID controller.

14. The hybrid system of claim 13, further comprising:
one or more computers incorporating the motor torque PID controller and the clutch pressure PID controller.

15. The hybrid system of claim 14, wherein the one or more computers include a transmission/hybrid control module (TCM/HCM).

16. The hybrid system of claim 14, wherein the motor torque PID controller and the clutch pressure PID controller are in the form of software.

17. The hybrid system of claim 13, wherein the motor torque PID controller and/or the clutch pressure PID controller include a PID controller that operates in accordance with the following equation:

$$u(t) = K_p e(t) + K_i \int_0^t e(\tau) d(\tau) + K_d \frac{d}{dt} e(t)$$

where:
u=controller output;
$K_p$=proportional gain (tuning parameter);
$K_i$=integral gain (tuning parameter);
$K_d$=derivative gain (tuning parameter);
e=error;
t=time; and
τ=integration variable.

18. The hybrid system of claim 13, wherein the compensation function is a linear function of the speed and the torque of the eMachine.

19. The hybrid system of claim 13, wherein motor torque PID controller configured to make adjustments in accordance with the following equation:

$$X = X_{ref} - K_{droop} y(n)$$

where:
X=eMachine measured speed;
$X_{ref}$=eMachine desired speed;
$K_{droop}$=droop tuning parameter; and
y(n)=eMachine motor torque.

20. The hybrid system of claim 13, wherein the clutch pressure PID controller incorporates an error function in accordance with the following equation:

$$e(n) = X_{open} - C_{ref} K_{droop} - X$$

where:
e=error;
$X_{open}$=open clutch eMachine speed;
$C_{ref}$=desired clutch torque;
$K_{droop}$=droop tuning parameter; and
X=measured eMachine speed.

21. The hybrid system of claim 13, wherein the clutch includes a hydraulic clutch.

22. The hybrid system of claim 13, wherein the touch point is where clutch plates in the clutch first contact one another.

23. A method, comprising:
controlling speed of an eMachine in a hybrid system to a desired speed with a motor torque PID controller that regulates torque of the eMachine, wherein the eMachine is operatively connected to a clutch;
actuating the clutch to a touch point by regulating clutch pressure with a clutch pressure PID controller to achieve a motor speed droop set in accordance with a desired clutch torque;
adjusting the desired speed for the motor torque PID controller by a compensation function, wherein the compensation function changes the desired speed to account for a change in torque caused by said actuating the clutch; and
maintaining the clutch at the touch point with the clutch pressure PID controller.

24. The method of claim 23, further comprising:
issuing a command to open the clutch;
stabilizing the speed of the eMachine by said controlling the speed of the eMachine after said issuing;
confirming the clutch is open;
achieving a motor speed droop by said adjusting; and
maintaining the clutch at the touch point with the clutch pressure PID controller.

25. The method of claim 23, further comprising:
closing the clutch after said actuating the clutch; and
restarting an engine with the eMachine after said closing the clutch.

26. The method of claim 23, wherein the compensation function is a linear function of the speed and the torque of the eMachine.

* * * * *